United States Patent [19]
> Krongos

[11] 3,780,869

[45] Dec. 25, 1973

[54] MULTIPLE WATER-FILTER DEVICE
[76] Inventor: Zaharias Krongos, 128 Sherman Ave., New York, N.Y. 10034
[22] Filed: May 16, 1973
[21] Appl. No.: 360,754

Related U.S. Application Data
[63] Continuation-in-part of Ser. No. 174,084, Aug. 23, 1971.

[52] U.S. Cl................. 210/317, 210/335, 210/449, 210/460
[51] Int. Cl............................................. B01d 29/24
[58] Field of Search.................... 210/240, 253, 254, 210/259, 260, 266, 302, 319, 317, 323, 340, 342, 338, 335, 459–464, 316

[56] References Cited
UNITED STATES PATENTS
640,721   1/1900   Vogler................................ 210/449
938,947   11/1909  Andres et al. ...................... 210/449

Primary Examiner—Samih N. Zaharna
Assistant Examiner—T. A. Granger
Attorney—Laforest S. Saulsbury et al.

[57] ABSTRACT
In a preferred embodiment of the invention, a water-filter device is provided in which there are a plurality of insert filters into different compartments which insert filters are easily removed by unscrewing a bottom male portion from a top female portion, with the water being channeled to the respective filter compartments in parallel flow with one-another with the outlets of the several filter inserts being into the respective compartments and with the compartments being in flow series with one-another from a first compartment receiving water solely from the outlet of its insert filter to a final compartment of the series which has an outlet into a channel in flow communication with the main device water outlet, the compactness of filter material preferably of sheeps' wool varying from compartment to compartment in the flow series of compartments, with the first compartment of the series having an insert of least insert filter material density and the last compartment of the series having an insert filter of filter material of the greatest density, filter material being also in the compartment of the flow series with the filter material being outside of the inserted filter, the filter material out of the inserted filters being of about the same density for each of the series of compartments, and there being additionally provided a valve mechanism for alternately passing water through the filters when the valve is in one position and through a bypass conduit bypassing the filters in their entirety when the valve is in an alternate position, the valve being preferably manually controllable, a good part of the utility of the present invention being the high efficiency of the fiber system together with the ease of access to and replacement of the insert filters.

7 Claims, 4 Drawing Figures

MULTIPLE WATER-FILTER DEVICE

This invention is a continuation in part of the U.S. Pat. application Ser. No. 174,084 filed Aug. 23, 1971, entitled WATER FILTER DEVICE which is the parent application, of which this application is entitled to the priority of the filing date thereof, and an improvement over U.S. Pat. No. 3,374,895.

This invention relates to a water filter apparatus having improved filtration of bacteria and for convenient maintainance on spigots.

BACKGROUND TO THE INVENTION

Prior to the present invention, the Applicant/Inventor invented the water filter of the above-noted prior application which of itself constitutes a major advance over previously existing water filters both from the standpoint of structure and efficiency. However, as with prior water faucet filter devices, the prior invention lacked certain practicality with regard to the optimizing of efficiency and the reduction of cost of manufacture and the convenience and ease of maintaining a high level of efficiency as well as maintaining the water filter device together with its filter system in top working order.

According to the prior invention, as well as prior art devices prior to that invention, the structures and mechanisms of the water filter devices available required complex structure and considerable difficulty in maintainance thereof in order to continually obtain a high degree of efficiency.

SUMMARY OF THE INVENTION

Accordingly, it is an object of the present invention to overcome difficulties and problems and disadvantages of the types discussed above.

Another object of the present invention is to obtain a water filter device providing for the use of inexpensive filter materials while obtaining and maintaining a high level of filtering efficiency.

Another object is to obtain a multiple number of filter exposures to the incoming water to be filtered while concurrently maintaining a maximum degree of filtration thereof.

Another object is to obtain a filtration mechanism which upon becoming less porous or clogged to one-extent or another, inherently in its nature of construction provides for continued maximum or at least high level efficiency in filtration of the water being filtered.

Another object is to obtain the preceding one or more objects while concurrently providing for an alternative total bypass of all filters of the filter system.

Another object is to obtain one or more of the preceding objects at a low or reduced cost of material as compared to prior filter devices, and/or production costs and/or cost of maintainance.

Another object is to obtain a water filtration filter device providing for multiple replaceable insert filters, and for such insert filters to be easily insertable and removable and of low cost in raw material as well as finished product.

Other objects become apparent from the preceding and following disclosure.

One or more objects of the present invention are obtained by the invention as defined herein.

The illustrated filter device of plastic and/or metal is used on either a male or female faucet having threads thereon, as well as providing for the attachment thereto of a hose or the like to the outlet of the filter device by threads or other appropriate desired and/or conventional means, while in its principal purpose providing for easier opening of the filter device and removal thereof of the multiple filter-inserts therein and replacement thereof such as by merely unscrewing the top half from a bottom half of the filter device preferably, or by other separation mechanism, into which bottom or top half, preferably the bottom half, there is seatable a filter containing structure divided into a plurality of compartments, which compartments are arranged in flow series but which compartments also have each in parallel with other compartments other inlets in flow parallel from a common water source, only the last compartment of the series in a preferred embodiment having an outlet port to an exterior or to a conduit leading to the exterior. and in the inlets to the inlets to the several compartments there being provided seats for insert filter structures which are removable in nature. The first compartment of the flow series has preferably solely an inlet through the inserted insert filter structure, and all other compartments of the flow series communicate with each other up to but not including the last compartment which -- as noted above -- communicated solely with the exterior at its outlet. There also is provided as a main feature, a double valve structure providing for two alternate positions, one of which positions channels the water through the filter system, and the other of which totally bypasses all of the filter system by a through-passage, there accordingly being preferably two separate apertures in the valve such that when one is aligned with its channel to the filter system, the other is not, and when the other is aligned with the through-passage, the one to the filter system is not aligned. The valve is typically and preferably manually controllable by an appropriate handle structure. Prefered optimal results are obtained by use of sheeps wool as the filtration media through which the water is to be filtered, but clearly other desired and-/or conventional filter composition -- such as crushed cork, etc. may be employed within the scope of the invention. An important element with regard to the efficiency and operability of the invention is a difference in the packing density of the sheep's wool or other filter composition placed in the flow-series compartments and/or in the inserts for the respective compartments. In one embodiment, the filter material outside of the inserts but in the flow path within the severally flow-series aligned compartments is of increasing density from first to last of the flow series, such that the individual inlet insert filters will offer greater resistance to flow therethrough for the compartments near the end of the flow-series aligned compartments than those of the first of the flow-series; but a preferred result is obtained by having the filter media in each of the serially arranged chambers (compartments) being of a same uniform density, but the density of the insert filter material of the first insert (insert for the first flow-series) filter being of low density and for each of the following flow-series of compartments the respective insert filter materials being of increasing density such that the last insert filter of the last compartment in flow series has the greater density, whereby the resistance to flow through the insert filters are all of about the same resistance since the additional resistance to flow through the additional chambers (compartments) of the flow series equalizes the pressure of the pressure-resistance

3 resulting from the differing densities. The insert filters are replaced about weekly.

Although not illustrated, it is also possible for one or more of the other compartments of the series to have some minor apertures or slits or the like for the exiting of water directly to the exterior but with the smaller and fewer number and size of the flow outlet space being in the first of the above-noted series of flow-series arranged compartments and with the sizes and number (one or both size and number) decreasing progressively in the flow-series of compartments such that flow into the first compartments of the series is always facilitated to some extent by at least a minor tendency for direct flow-through the individual compartment only directly to the exterior or to a conduit leading to the exterior, while the main flow is channelled through the flow-series of compartments.

It should be noted that upon the decrease in rate of flow through any particular insert filter, there will be a concentration of flow through other filters and in the due-time final result the other filters will eventually become less porous as the material filtered from the water gradually reduces rate of flow, whereby the pressure differentials will again tend to become again properly established. Insert filters are replaced only as necessary.

As a matter of fact in the operation of actual operative models, the observation of flow data has evidenced the even flow through all chambers of the flow series, while maintaining a high level of filtering efficiency such as for the Coliform test -- which as known by those familiar with water treatment, a Coliform count is the measure of contamination or lack thereof. In an analysis of the efficiency of the present inventive filter device, for example, in one test where it was found that the water was at least partially contaminated, where the non-filtered water contained 1600 Coliform per milliliter of water, the present inventive filter device resulted in the filtered water being (having) "0"(zero) Coliform organisms per ml., a total removal thereof.

For the benefit of those who think that modern-day water municipal systems are fool-proof and that the fluorinating and/or chlorine treatments of the water at the water purification plants and at specific points along the pipe delivery systems totally eliminates the need for faucet filters for bacteria removal, it is noted that water flow dynamics are often unpredictable as well as the fact that along the water conduit route there are long spaces in between chemical insertion points, and depending upon where the consumer is located between these points the bacteria can vary considerably, being much more and significantly greater at points just prior to reinsertion of new chemicals. Thus, a family might well be of the impression that water is highly pure when in fact there is a high level of contamination. This has just recently be evidenced to a shocking degree in several major cities, making television now.

The invention may be better understood by making reference to the following figure descriptions.

THE FIGURES

DETAILED DESCRIPTION OF THE INVENTION

Figure 1:
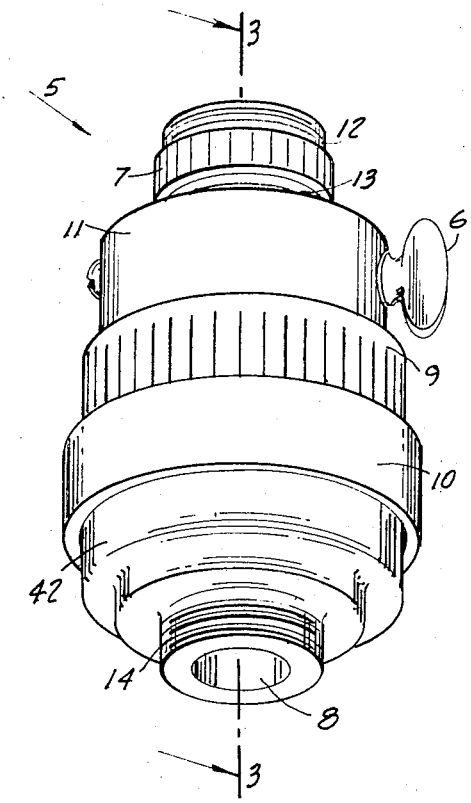
FIG. 1 illustrates a typical water filter device of the present invention shown in front-side perspective view.
Figure 3:
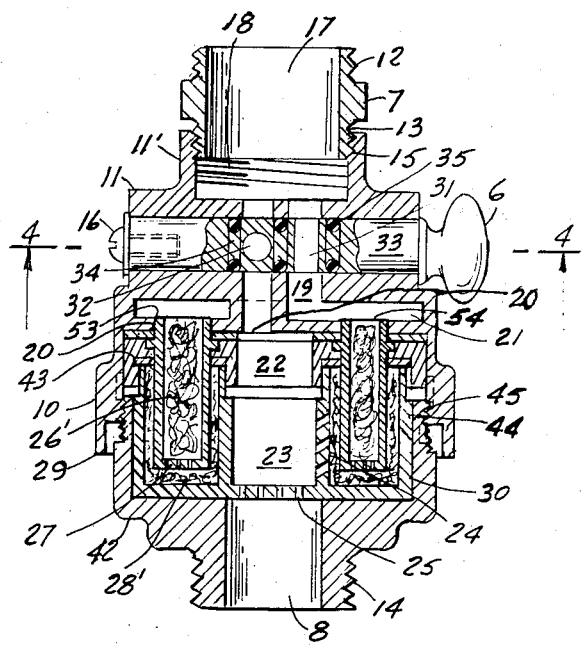
FIG. 3 illustrates a cross-sectional view as taken along lines 3—3 of FIG. 1.
Figure 4:
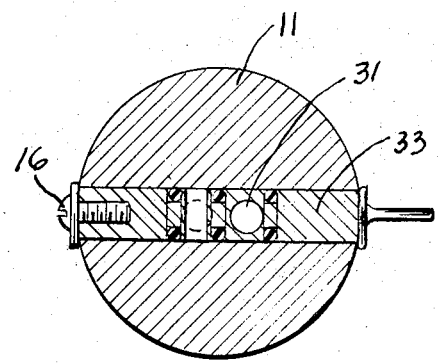
FIG. 4 illustrates a cross-sectional view as taken along lines 4—4 of FIG. 3
Figure 2:
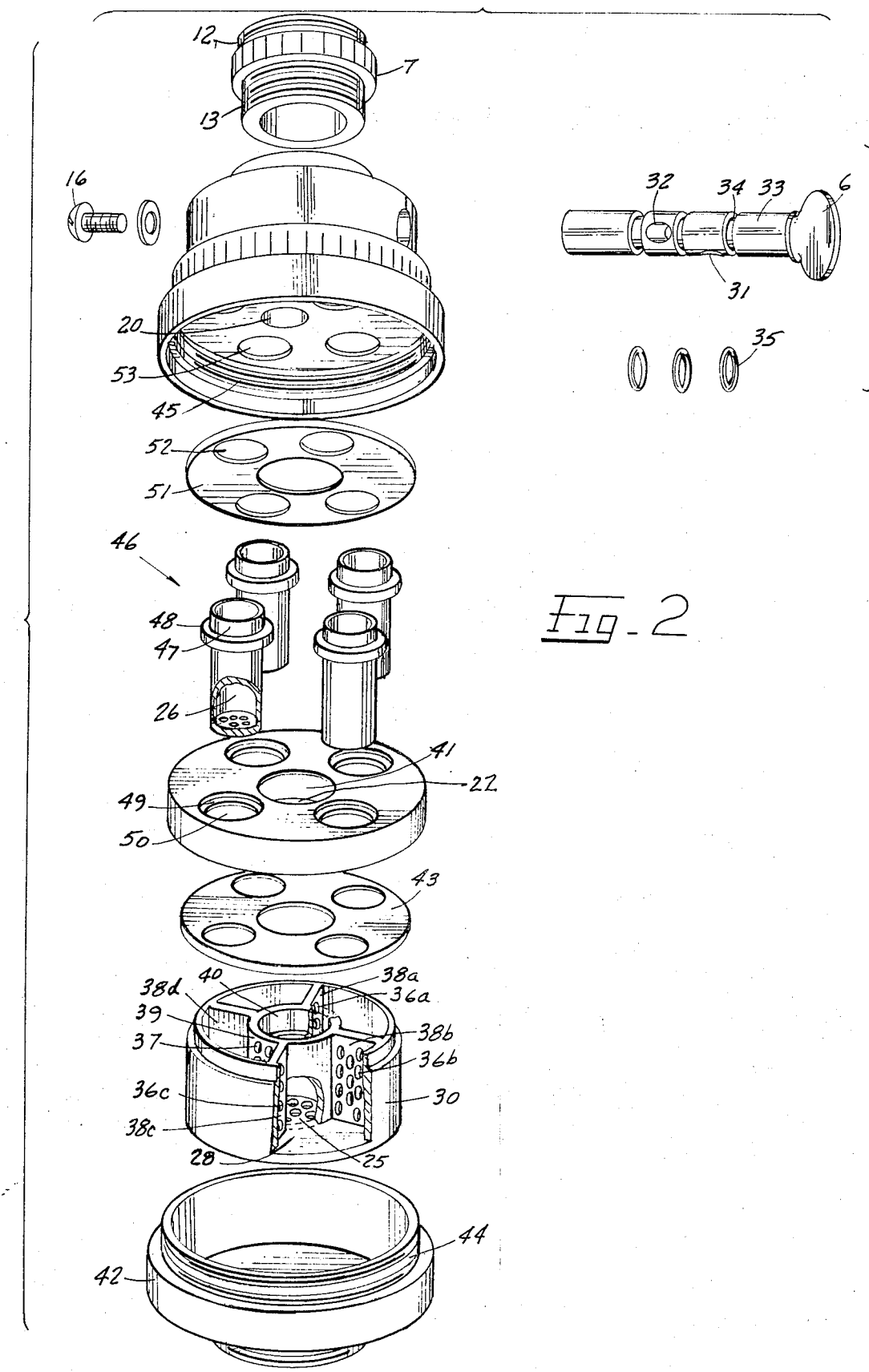
FIG. 2 illustrates an exploded view of the embodiment of FIG.1.

With reference to the above-noted several Figures, a preferred embodiment is illustrated therein, including the overall filter device 5, having a valve handle 6 for shifting between filter and non-filter positions. Adapter 7 permits adaptation of the device 5 from a female piece to a male piece having male threads 12 for use with a female-threaded faucet. The water outlet port of the device is port 8. The device 5 includes an upper portion 9 and a lower portion 42, with a female mating portion 10. The upper portion 9 includes a valve-body structure 11. The adapter 7 has male threads 13 which mate with female threads 15 of the device 5. The outlet portion of device 5 includes preferably female threads 14. The valve 33 of valve handle 6 is secured into position by the securing threaded screw 16, together with its washer, as seen in FIG. 2 in exploded view. In FIG. 3 cross-section, there may be seen the device 5 with the inlet space or port 17 of the adapter 7, which space is continuous with space 18 of the device inlet. From the space 18, in the FIG. 3 illustrated valve position, the flow space 18 is continuous with the aligned valve channel 31 and the channel 19 of structure 11, channel 19 leading commonly into the flow space 21 feeding the inlets 54 of the insert filters 46. From the flow space 21 water is flowable through channeling outlet 53 into which upper ends 47 of the insert filters 46 are seated against insert flanges 48 which flanges sit, on their opposite faces, in seat 49 of the filter structure top having through holes 53. Rubber seal 51 has its through-holes 52, while rubber seal 43 has corresponding through-holes. From the valve 33, a second passage 32 illustrated in the closed position, when open communicates the space 18 with conduit 20 which empties into the outlet space 22 which continues with outlet space 23 to the port 8. One compartment of the filter structure of the lower member 30 communicates with space 23 by apertures 24, and the space 23 with the port 8 by apertures 25. Located in the insert filter structures 46 is a through space 26 having therein filter material 26', and the space 26 communicates with space 28 by apertures 27. The upper device structure 9 and 10 include an overhang-flange 29 with an optional ring seal. Within the valve structure are the through channels 31 and 32, and gasket-narrowed portions 34 with gaskets (rings) 35.

The compartment filter structure 30 defines a plurality of compartments having separating walls 38a, 38b, and 38c, each respectively with apertures 36a, 36b, and 36c, in flow series, but without apertures in wall 38d but with apertures 37 in wall 39 for outlet flow from that compartment -- the last flow-series compartment. Opening 40 receives the downwardly flanged neck 41 of the compartments top portion (lid). The O-rings 35 fit on the necks 34 of the valve 33. As best seen in FIG. 2, the upper device portion 9 includes female threads 45, which mate with male threads 44 of the lower portion 42.

It is to be understood that the above illustrative Figures are for purposes of facilitating a proper understanding of the heart of the invntion and are not intended to unduly limit the scope of the invention, the invention including variations, modifications, substitution of equivalents, and the like as would be obvious to a person of ordinary skill.

Accordingly, in that spirit -- for example, as another and alternate embodiment for obtaining an equalized pressure for resistance to flow into the insert filter elements 46 in order that there will be flow through the series of cells as opposed to merely into the last cell of the flow series because of there being less filter material to flow through theoretically as opposed to the earlier cells -- this point having been previously discussed above, an alternate provision to the afore-mentioned varying densities of the filter material in the different compartment's insert filters 46, is to use the same density in each filter, but to have apertures or slots 27 smaller and/or fewer in number in the insert for the last cell of the flow series, while the next forward cell of the flow series has an insert filter with apertures 27 of slightly larger and/or more numerous, and in like manner in the next and the next preceding cells of the flow series the size and/or number of apertures in the insert filter becoming progressively greater, such that for the last cell's insert filter, for example, the resistance to flow through that insert filter is substantially greater than progressively each of insert filters of preceding cells of the flow series, this resulting in a substantially identical overall resistance to flow per cell because of the off-setting greater amount of filter material through which the water must flow for the earlier cells of the flow series than for the later cells of the flow series.

I claim:

1. A faucet water filter device comprising in combination: an enclosure means comprising upper and lower enclosure means defining said enclosure, one said upper and lower enclosure means having male threads and the other having female threads, each of the enclosure-defining upper and lower enclosure means including sealing means and including seating elements seatable against the sealing means sealably, each of the sealing means coordinately defining with one-another a filter means and a through-passage through the filter structure, there being an inlet port in one of the upper and lower enclosure means and an outlet port in the other of the upper and lower enclosure means, the enclosure means having the inlet port communicating separately with each of said through-passage and said filter means, and said inlet port including a valve means for concurrently opening a flow path to the filter means and concurrently closing a path to said through-passage and alternately for concurrently closing a flow path to the filter means and concurrently opening a flow path to said through-passage, the filter means including a compartmented structure of a plurality of compartments each having an inlet in parallel with other compartments' inlets of the plurality, at least two compartments of the plurality being in flow series with one-another with the second thereof having an outlet in communication with the outlet port and with the first of the two compartments in flow series having an outlet solely in communication with the second compartment of the flow series two compartments, and including an insert filter means sealably inserted within the inlet of each compartment of the plurality, each insert filter means defining a through-passage therethrough and including filter media in the through-passage, filter media in the through-passage of the series being more densely packed than filter media in the through-passage of a preceding compartment of the flow series of compartments of the plurality, and each compartment of the series of the plurality of compartments including additional filter media in flow series following flow from the respective compartment's insert filter means and that respective compartment's flow outlet.

2. A faucet water filter device of claim 1, in which each insert means is removable from its respective seat in the respective compartment's inlet, and in which each insert means is such that when removed it is replacable by an alternate insert filter means, each said insert filter means and each of said upper and lower enclosure means being shaped such that when the male and female threads of the upper and lower enclosure means are mated together, the insert filter means is locked into its respective seat in its respective compartment inlet, and each insert filter means being free for removal when said male and female threads are disengaged and the upper and lower enclosure means separated from one-another.

3. A faucet water filter device of claim 2, including a sealing element seatable on top of the inserts sealably thereof of flexible sealing gasketry composition.

4. A faucet water filter device of claim 3, in which there is included a segregating element sealably placeable across the top of open compartment structures and receivable of the respective insert filter means and definable of the respective compartments inlet in parallel receivable of the respective insert filter means.

5. A faucet water filter device of claim 4, including a gasket between the segregating element and the open space of the respective plurality of compartments defined by the filter means compartment structure.

6. A faucet water filter device of claim 4, including a gasket retainably lockable on top of a periphery of each insert filter means.

7. A faucet water filter device comprising in combination: an enclosure means comprising upper and lower enclosure means defining said enclosure, one said upper and lower enclosure means having a locking element and the other having a locking-element receiving structure such that the upper and lower enclosure means are detachably lockable together, each of the enclosure-defining upper and lower enclosure means including sealing means and including seating elements seatable against the sealing means sealably, each of the sealing means coordinately defining with one-another a filter means and a through-passage through the filter structure, there being an inlet port in one of the upper and lower enclosure means and an outlet port in the other of the upper and lower enclosure means, the enclosure means having the inlet port communicating separately with each of said through-passage and said filter means, and said inlet port including a valve means for concurrently closing a path to said through-passage and alternately for concurrently closing a flow path to said filter means and concurrently opening a flow path to said through-passage, the filter means including a compartmented structure of a plurality of compartments each having an inlet in parallel with other compartments' inlets of the plurality, at least two compartments of the plurality being in flow series with one-another with the second thereof having an outlet in communication with the outlet port and with the first of the two compartments in flow series having an outlet solely in communication with the second compartment of the flow series two compartments, and including an insert filter means sealably inserted within the inlet of each compartment of the plurality, each insert filter means defining a through-passage there-through and having space provided for the inclusion of filter media in flow series within the insert filter means through-passage, the insert filter means for the second compartment of the flow series having flow outlet port means of a first predetermined volume of flow for a predetermined pressure and the insert filter means for a preceding compartment of the flow series having flow outlet port means of a second predetermined volume of flow for said predetermined pressure, said first predetermined volume being less than said second predetermined volume of flow, and each compartment of the flow series of the plurality of compartments including additional space receivable of additional filter media in flow series following flow from the respective compartment's insert filter means and that respective compartment's flow outlet.

* * * * *